July 15, 1969  R. A. TROY  3,455,459
FILTER
Filed March 21, 1967

INVENTOR
RAYMOND A. TROY
BY
ATTORNEY

3,455,459
FILTER

Raymond A. Troy, Ramsey, N.J., assignor to Walter Kidde & Company, Inc., Belleville, N.J., a corporation of New York
Filed Mar. 21, 1967, Ser. No. 624,803
Int. Cl. B01d 25/16, 29/10
U.S. Cl. 210—315     2 Claims

ABSTRACT OF THE DISCLOSURE

Tubular filter structure composed of porous inner and outer tubes and a tubular filter membrane held between the tubes.

BACKGROUND OF THE INVENTION

Field of the invention

The present invention relates to filters, and more particularly to an improved filter apparatus utilizing a tubular filter unit for removing fine particles from gases and liquids.

SUMMARY OF THE INVENTION

Accordingly, an object of the present invention is to provide such a filter apparatus which enables the filter unit to be readily removed for cleaning or replacement.

Another object is to provide such apparatus which is readily fabricated in an economical manner.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention for the foregoing objects are generally accomplished by providing filter apparatus comprising a housing; tubular filter unit mounted in the housing including an inner porous tube, an outer porous tube and a tubular filter membrane held between the tubes, one end of the filter unit being closed; and the housing having a first passageway in fluid flow communication with the interior of the filter unit at its other end and having a second passageway in fluid flow communication with the exterior of the filter unit.

DESCRIPTION OF THE PREFERRED EMBODIMENTS

Figure 1:
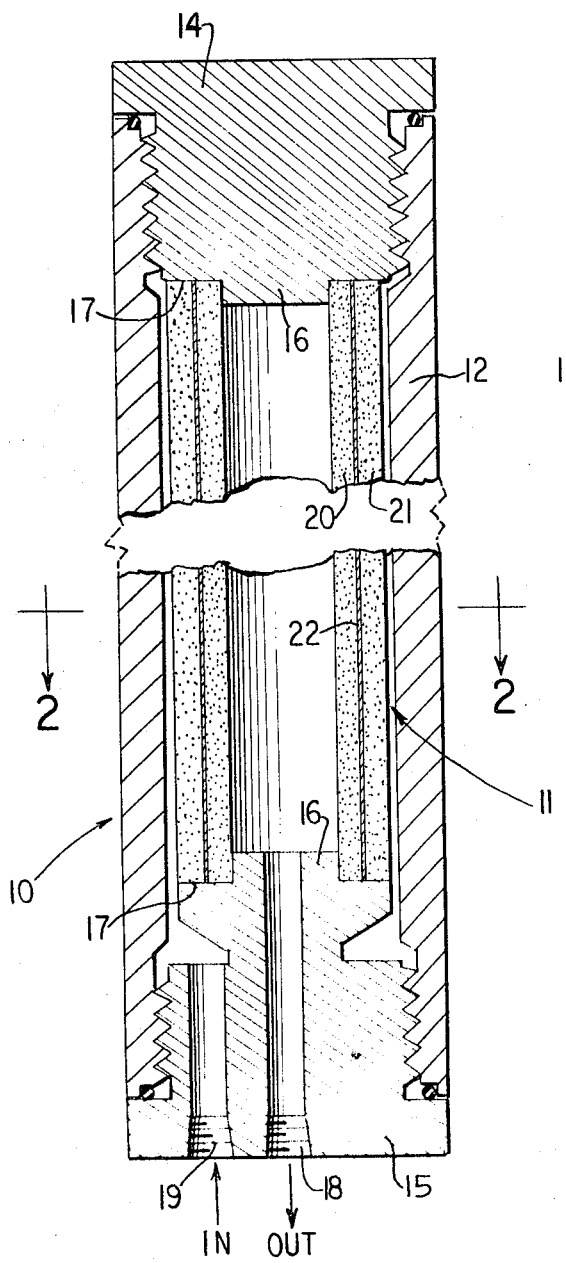
FIG. 1 is a longitudinal sectional view of filter apparatus in accordance with the present invention.

Referring now to the drawing in detail, there is shown filter apparatus which generally comprises a housing 10 and a tubular porous filter unit 1 concentrically mounted in the housing.

The housing 10 includes a tubular body 12 having opposite end openings, a first plug 14 removably threaded into one of the end openings, and a second plug 15 removably threaded into the other end openings. Both plugs have a central boss 16 fitted into an end of the filter unit 11 and both have an annular surface 17 surrounding its boss 16 which engages and seals an end surface of the filter unit. The boss of the plug 14 serves to close one end of the filter unit and the plug 15 is formed with a central passageway 18 in fluid flow communication with the interior of the filter unit and with a centrally offset passageway 19 in fluid flow communication with the space between the outer wall of the filter unit and the inner wall of the housing body 12. Preferably the passageway 19 constitutes the inlet of the housing and the passageway 18 constitutes the outlet of the housing.

Figure 2:
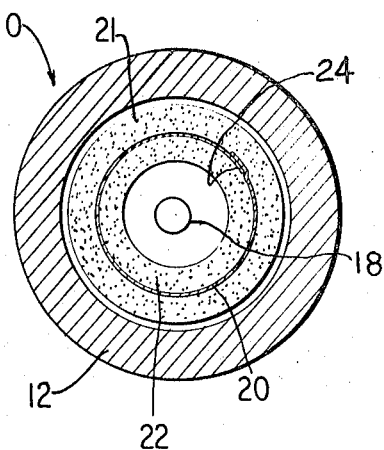
FIG. 2 is a sectional view taken along the line 2—2 on FIG. 1.

The filter unit 11 includes an inner porous tube 20, an outer porous tube 21, and a tubular filter membrane 22 held between the tubes and in contact therewith. In the event the membrane is extremely thin, it is wrapped about the inner tube 20 with an overlay at 24 (FIG. 2) and the membrane and inner tube are then inserted into the outer tube 21.

The filter unit 11 is constructed of any suitable materials. For example, the tubes 20 and 21 may be formed of porous polyethylene and the membrane may be a sheet composed of glass fibers impregnated with Teflon. This sheet has a shiny side which preferably is installed in the filter unit so that it faces outwardly.

As a specific example of the present invention a filter unit 11 for filtering liquid hydrogen peroxide was constructed of inner and outer tubes of porous polyethelene having pores of about 35 microns and a wall thickness of about 0.25 inch, and a fiber-glass Teflon impregnated membrane having pores of between about 2 and about 7 microns and a thickness of between about 0.002 and about 0.003 inch.

The filter apparatus is assembled by applying either of the plugs, inserting the filter unit and applying the other plug. When the filter unit becomes contaminated with filtered out particles, one of the plugs is unscrewed and the filter unit is removed. A clean filter unit is inserted to replace the contaminated filter unit and the unscrewed plug is reapplied.

From the foregoing description, it will be seen that the present invention provides simple, practical and economical filter apparatus.

What is claimed is:

1. Apparatus for filtering fluids containing micron size particles, the apparatus comprising a hollow cylindrical housing having internal screw threaded sections adjacent each end thereof provided with an annular shoulder at the extreme outer end thereof; an annular gasket seated on each of said shoulders; a first plug screw threaded into one end of said housing having a flange at its outer end engaging one of said gaskets and compressing the same to provide a seal and having a central circular boss at its inner end surrounded by an annular surface; a second plug screw threaded into the other end of said housing having a flange at its outer end engaging the other of said gaskets and compressing the same to provide a seal and having a central circular boss at its inner end surrounded by an annular surface, said second plug having a first passageway extending through its said boss and having a second passageway extending therethrough and directly into said housing at one side of said first passageway; and a filter unit spaced from the inner wall of said housing to provide a flow path in communication with said second passageway, said filter unit including a unitary hollow cylindrical porous outer tube, a unitary hollow cylindrical porous inner tube and a tubular membrane between said tubes and in contact therewith, said bosses being fitted into said inner tube and the ends of said filter unit engaging said annular surfaces to form a seal, said tubes having pores of about 35 microns and having a wall thickness sufficient to provide a filtering function and said membrane having pores of between about 2 and 7 microns and a thickness of between about 0.002 and about 0.003 inch.

2. Apparatus according to claim 1 for filtering hydrogen peroxide, wherein said tubes are constructed of polyethylene and said membrane is formed of fiber glass impregnated with Teflon.

References Cited
UNITED STATES PATENTS

| | | | |
|---|---|---|---|
| 520,293 | 5/1894 | Blackmore | 210—489 X |
| 564,657 | 7/1896 | Stiebel | 210—453 X |
| 911,682 | 2/1909 | Scheunert | 210—453 X |
| 1,095,198 | 5/1914 | Finch | 210—453 X |
| 1,693,741 | 12/1928 | Wuest | 210—489 X |
| 1,940,923 | 12/1933 | Stringer | 210—442 X |
| 2,746,607 | 5/1956 | Hess | 210—454 X |
| 3,019,904 | 2/1962 | Stecher | 210—23 X |
| 3,080,976 | 3/1963 | Thompson et al. | 210—458 X |
| 3,224,590 | 12/1965 | Nord et al. | 210—442 X |
| 3,365,864 | 1/1968 | Iizima | 55—487 X |

REUBEN FRIEDMAN, Primary Examiner

FRANK A. SPEAR, Jr., Assistant Examiner

U.S. Cl. X.R.

55—485, 487; 210—443, 453, 454, 489